United States Patent
Khasnabish

(10) Patent No.: US 8,850,003 B2
(45) Date of Patent: Sep. 30, 2014

(54) METHOD AND SYSTEM FOR HIERARCHICAL TRACKING OF CONTENT AND CACHE FOR NETWORKING AND DISTRIBUTION TO WIRED AND MOBILE DEVICES

(75) Inventor: Bhumip Khasnabish, Lexington, MA (US)

(73) Assignees: ZTE Corporation, Richardson, TX (US); ZTE (USA) Inc. (CN)

( * ) Notice: Subject to any disclaimer, the term of this patent is extended or adjusted under 35 U.S.C. 154(b) by 165 days.

(21) Appl. No.: 13/641,837

(22) PCT Filed: May 7, 2010

(86) PCT No.: PCT/US2010/034011
§ 371 (c)(1),
(2), (4) Date: Nov. 14, 2012

(87) PCT Pub. No.: WO2011/133167
PCT Pub. Date: Oct. 27, 2011

(65) Prior Publication Data
US 2013/0054797 A1    Feb. 28, 2013

Related U.S. Application Data

(60) Provisional application No. 61/325,847, filed on Apr. 20, 2010.

(51) Int. Cl.
G06F 15/16    (2006.01)
H04L 29/08    (2006.01)
G06F 17/30    (2006.01)

(52) U.S. Cl.
CPC .... H04L 29/08414 (2013.01); H04L 29/08513 (2013.01); G06F 17/30094 (2013.01)
USPC ............ 709/224; 709/203; 709/206; 370/331

(58) Field of Classification Search
USPC ........................... 709/203, 206, 224; 370/331
See application file for complete search history.

(56) References Cited

U.S. PATENT DOCUMENTS

| 5,109,306 | A | * | 4/1992 | Mase et al. ................. 360/77.04 |
| 5,513,336 | A | * | 4/1996 | Vishlitzky et al. ............ 711/136 |
| 6,101,547 | A |   | 8/2000 | Mukherjee et al. |
| 6,330,572 | B1 |  | 12/2001 | Sitka |
| 7,236,764 | B2 | * | 6/2007 | Zhang et al. .................. 455/346 |

(Continued)

*Primary Examiner* — Tesfay Yohannes
(74) *Attorney, Agent, or Firm* — Drinker Biddle & Reath LLP

(57) ABSTRACT

Embodiments of the present invention are directed to a system and apparatus for tracking media content (storage) and its cache (that is synched with the original content) in a large-scale wide-area distributed network. The system includes at least one mini tracker which is configured to keep information on the location of the content and to distribute this information to micro trackers in a first jurisdiction. The system also includes at least one zone tracker which is configured to keep information on the location of the content in a region and to distribute this information to mini trackers in a second jurisdiction. The system further includes a master tracker which is configured to keep information on the location of the content in all regions in a third jurisdiction to distribute this information to zone trackers in the third jurisdiction. The micro tracker (in wired or mobile end device/point) is configured to obtain location information from at least one of the mini tracker or zone tracker if a primary source malfunctions.

16 Claims, 4 Drawing Sheets

(56) References Cited

U.S. PATENT DOCUMENTS

| | | |
|---|---|---|
| 7,287,180 B1 | 10/2007 | Chen et al. |
| 8,037,140 B2 * | 10/2011 | DelGaudio et al. ........... 709/206 |
| 2002/0059604 A1 | 5/2002 | Papagan et al. |
| 2005/0254686 A1 * | 11/2005 | Koizumi ...................... 382/103 |
| 2007/0064974 A1 * | 3/2007 | Ayachitula et al. ........... 382/103 |
| 2008/0174485 A1 * | 7/2008 | Carani et al. ............. 342/357.07 |
| 2008/0229037 A1 * | 9/2008 | Bunte et al. .................... 711/162 |
| 2009/0087085 A1 * | 4/2009 | Eaton et al. ................... 382/159 |
| 2009/0315767 A1 * | 12/2009 | Scalisi et al. ............. 342/357.07 |
| 2010/0235432 A1 * | 9/2010 | Trojer ........................... 709/203 |

\* cited by examiner

METHOD AND SYSTEM FOR HIERARCHICAL TRACKING OF CONTENT AND CACHE FOR NETWORKING AND DISTRIBUTION TO WIRED AND MOBILE DEVICES

CROSS-REFERENCE TO RELATED APPLICATIONS

This application is a national stage application (under 35 U.S.C. §371) of PCT/US2010/034011, filed May 7, 2010, which claims benefit of U.S. Provisional Application No. 61/325,847, filed Apr. 20, 2010.

FIELD OF THE INVENTION

This invention is directed to a method and apparatus for hierarchical tracking of content and/or cache for efficient delivery and distribution of information to wired and mobile devices.

BACKGROUND

In a traditional content delivery/distribution network, the contents are stored in one or more centralized locations, and then distributed to the endpoints from centralized servers. The contents are distributed either directly or through a pre-arranged proxy server. This arrangement works well in a small-scale system where the contents are mostly static.

However, when the contents are updated very often, and when the set of users and the distribution network are very large, both the distribution of the contents among the servers and medium and long-haul access to these servers for up-to-date contents cause several problems. For example, this causes an excessive amount of traffic in the transport network which leads to excessive delay in downloading the contents because of congestion in the transport segment of the network.

In order to overcome these problems, researchers have experimented with the concept of distributed hash tables (DHT) for peer-to-peer communications and file sharing. DHT relieves the system of the need for centralized servers by using an algorithmic approach for efficient routing to disseminate control information related to the content or file from peer-to-peer. The DHT approach, therefore, helps to achieve an improved level of scalability and storage.

However, because DHT does not use keyword searches to find the desired information or files, the probability of successfully finding the exact desired information varies significantly. The probability of success can be improved if specific information were to be employed. However, the specific information required is rarely available. Because of the use of different virus protection mechanisms in each peer, the downloaded files could inadvertently bring in serious security threats to the hosts and the mobile devices.

BRIEF SUMMARY OF THE INVENTION

An embodiment of the present invention is directed to a method and apparatus for tracking media content (storage) and its cache (that is synched with the original content) in a large-scale wide-area distributed network. The system is capable of seamlessly distributing media content to wired and mobile-wireless devices. The system supports the required level of scalability, resiliency, security, and efficiency, and is suitable for next-generation content distribution networking (NG-CDN). Embodiments of the present invention implement hierarchical tracking of media content by employing four types of trackers in a system for hierarchical dissemination of control information related to the media content or file.

BRIEF DESCRIPTION OF THE DRAWINGS

Embodiments of the invention will now be further described in the following more detailed description of the specification when read with reference to the accompanying drawing in which.

DETAILED DESCRIPTION OF THE INVENTION

The present inventions now will be described more fully hereinafter with reference to the accompanying drawings, in which some examples of the embodiments of the inventions are shown. Indeed, these inventions may be embodied in many different forms and should not be construed as limited to the embodiments set forth herein; rather, these embodiments are provided by way of example so that this disclosure will satisfy applicable legal requirements.

When a system uses a hierarchical topology, a prefix routing mechanism is required or a routing key must be aggregate-able. In a content distribution networking (CDN) system, a routing key is a content identifier (ID) or chunk ID, and is typically hashed from a file/chunk name, which is a random number and not aggregate-able. A chunk is a file or a segment of the content. In addition, it is not possible to deduce location information from the file/chunk name. If a content producer inserts its own location information into the content ID or chunk ID, there may be difficulty in determining the original location information and formulating a correct content/chunk ID by the content consumers. One solution would be to use a virtual prefixing method and, in the worst case, a few redirection or embedded URL procedure may be needed to identify original location.

As is known to those skilled in the art, in a small network, it is a common practice to partition the capacity of the storage servers in order to utilize the same physical platform for caching and storing the contents and chunks. However, in a very large network, the use of centralized servers is not recommended because that will generate significant amount of transport traffic when a user wants to download content, and will negatively impact both cost for service and performance of the service. Managed peer-to-peer and peer-to-peer streaming techniques attempt to improve the situation in CDN by distributing the information about content and chunk locations so that the user can download content from the nearest content/chunk server.

Embodiments of the present invention allow for incorporation of hierarchy information and additions of multiple layers (in multiple domains) which will make the CDN system more scalable because of the distributed and hierarchical nature of the system. Incorporation of hierarchy information and multiple layers in multiple domains will also make the CDN system very cost-effective because cheap storage capacity can be added incrementally without impacting reliability.

Figure 1:
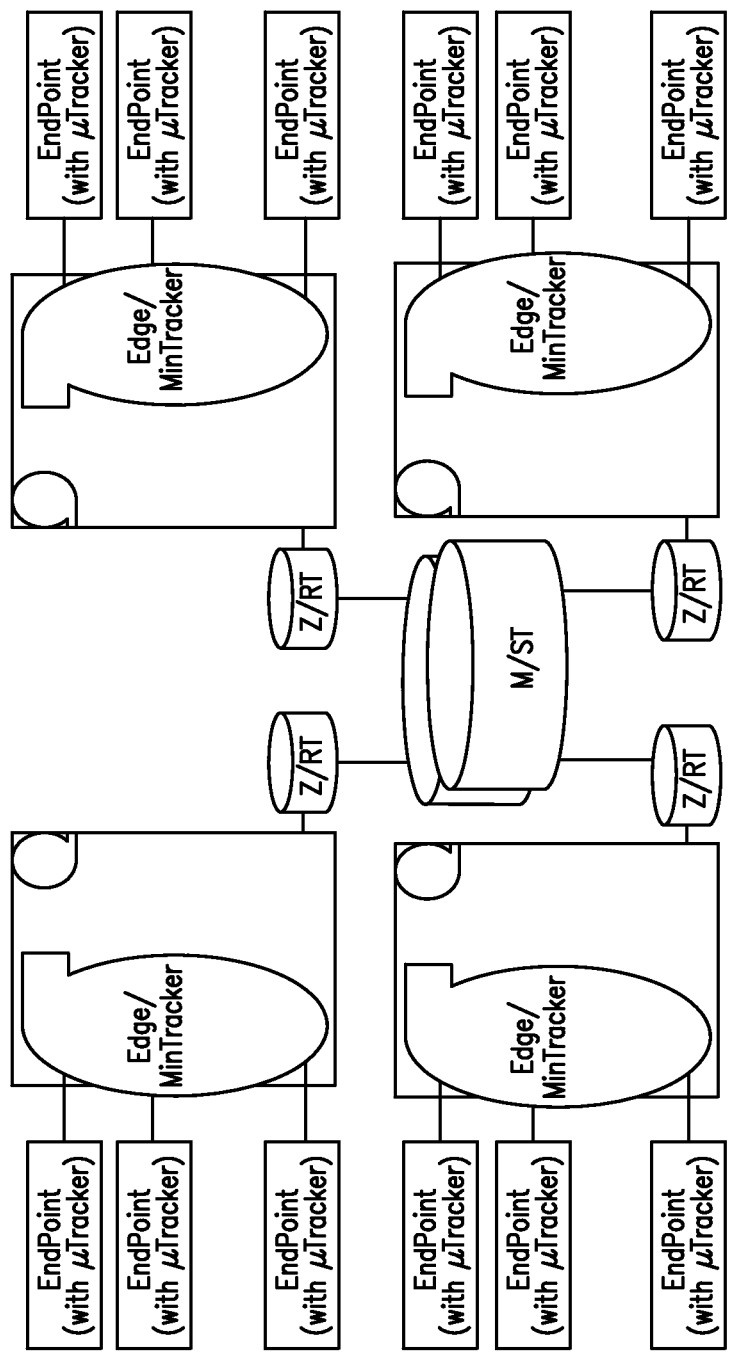
FIG. 1 illustrates an embodiment of a hierarchical tracker-based NG-CDN architecture.

When a hierarchal mechanism is utilized, any wired and mobile device can obtain updated information about the location of the chunk and/or content through multiple ways. For example, updated information about the location of the chunk and/or content can be obtained from a mini-tracker or a regional-tracker and from multiple sources if the primary source is overloaded or malfunctioning. Hierarchical organization not only provides robustness or storage, it also guarantees accessibility within bounded time, just like the PSTN (public switched telephone network) networks FIG. 1 illustrates an embodiment of a hierarchical tracker-based NG-CDN architecture. Four types of trackers are defined for hierarchical dissemination of control information related to the content or file. These trackers include micro-trackers (μTrackers), mini-trackers (MNT), zonal/regional trackers (Z/RT), and a master or super tracker (M/ST). In general, multiple micro-trackers (μTrackers) are served by one mini tracker (MNT), multiple clusters (in one admin domain) of mini-trackers are served by one zonal/regional tracker (Z/RT), and multiple zonal/regional trackers are served by one logical (virtual) master or super tracker (M/ST). One M/ST can be implemented by a full-protected logical ring of high-capacity trackers (servers), and these servers can be geographically distributed to support geo-redundancy.

A micro-tracker provides a sort of default or pre-provisioned or most-likely location of content or a chunk, a file or a segment of the content. Micro-trackers can be embedded in soft-endpoints and hard-endpoints. A mini-tracker keeps information on a location of the contents and the chunks, and then distributes this information to the micro-trackers within its jurisdiction. Multiple micro-trackers are served by one mini-tracker. A zonal/regional tracker keeps information on the location of the contents and the chunks in a zone or region (logical or physical geographical boundary), and then distributes this information to the mini-trackers within its jurisdiction. Multiple clusters (in one admin domain) of mini-trackers are served by one zonal/regional tracker. A master/super tracker keeps information on location of the contents and the chunks in all zones or regions (logical or physical geographical boundary) within its jurisdiction, and then distributes this information to these zonal/regional trackers. Multiple zonal/regional trackers are served by one logical (virtual) master/super tracker.

Hence, FIG. 1 illustrates a hierarchical system in which a master/super tracker serves multiple zonal/regional trackers. A zonal/regional tracker serves several edge/mini-trackers. An edge/mini-tracker serves several endpoints, each with an embedded micro-tracker. Under normal operations where there is no overloading or malfunctioning of any category of the hosts, endpoints receive up-to-date information about location of the chunk/storage from the next host in the hierarchy, i.e., an associated edge/mini-tracker. However, during fault or overload situations, the endpoint has the authority to bypass the faulty (or overloaded) hosts.

When a hierarchal mechanism is utilized, multilevel authentication and authorization can be easily implemented and maintained because it offers a higher level of scalability. Access to the regional-tracker and/or super-tracker can be allowed only when the endpoint with embedded micro-tracker cannot get timely update from the mini-tracker.

Figure 2:
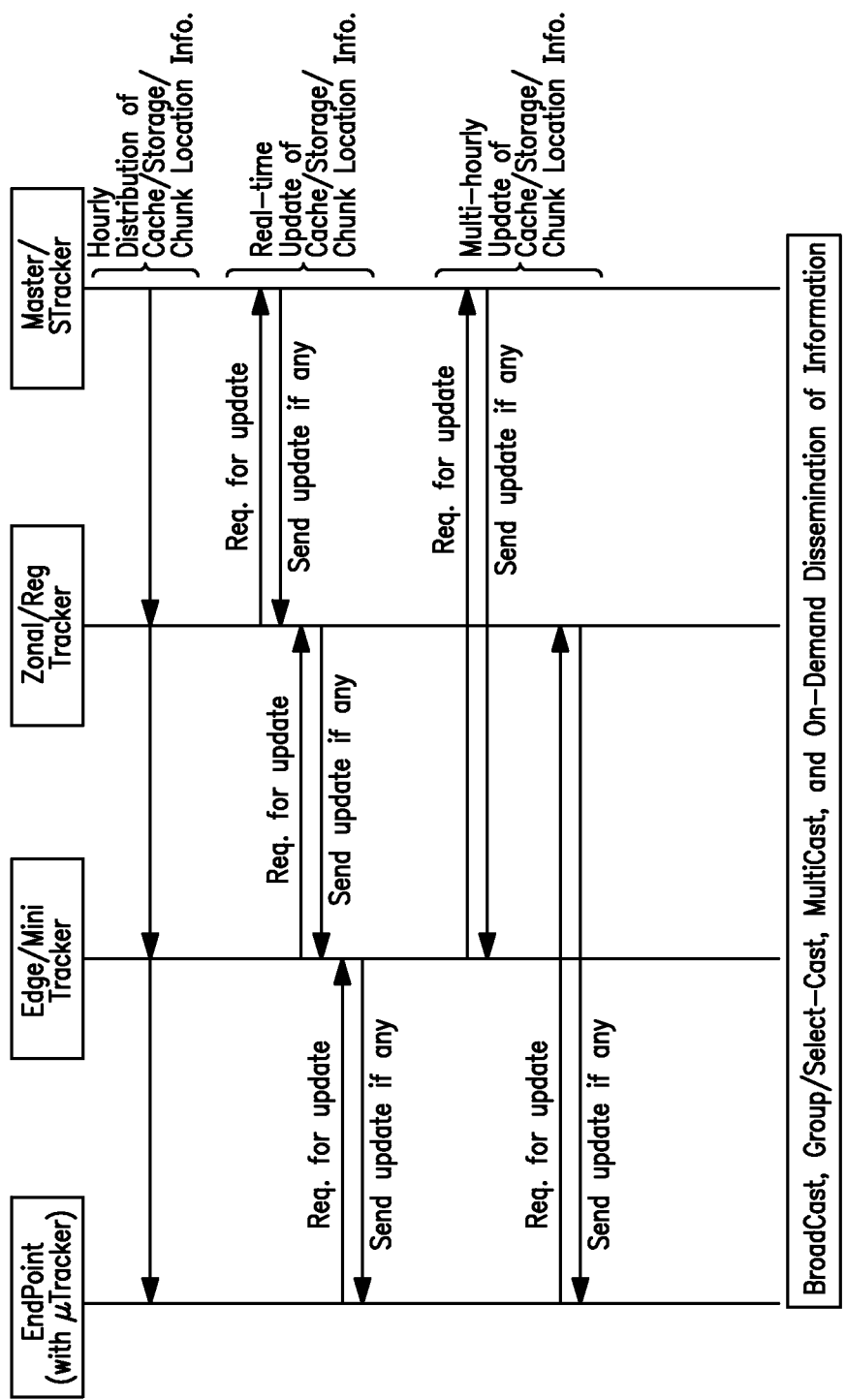
FIG. 2 illustrates an embodiment of the invention for the distribution of storage, cache, and chunk location information from a master/super tracker to a micro-tracker.

FIG. 2 illustrates an embodiment of the invention for the distribution of storage, cache, and chunk location information from a master/super tracker to a micro-tracker. According to an embodiment of the invention, one or more of a broadcast, Group/Select-Cast, multi-cast, and On-Demand technique may be used in the dissemination of information. For on-demand dissemination of location information, real-time, non-real-time, and off-time (in the background) updating are supported.

As shown in FIG. 2 information is initially sent from the master/super tracker to the micro-tracker through the zonal/regional tracker and the mini-tracker, respectively. The information may be sent at a predefined time, for example, hourly. Thereafter, the zonal/regional tracker may request and receive a real-time update from the master/super tracker, the mini-tracker may request and receive a real-time update from the zonal/regional tracker, and the micro-tracker may request and receive a real-time update from the mini-tracker. At a predefined period (say every 3 or 6 or 12 hours), the mini-tracker may request and receive an update from the master/super tracker, via the zonal/regional tracker, and the micro tracker may request and receive an update from the zonal/regional tracker, via the mini-tracker.

Figure 3:
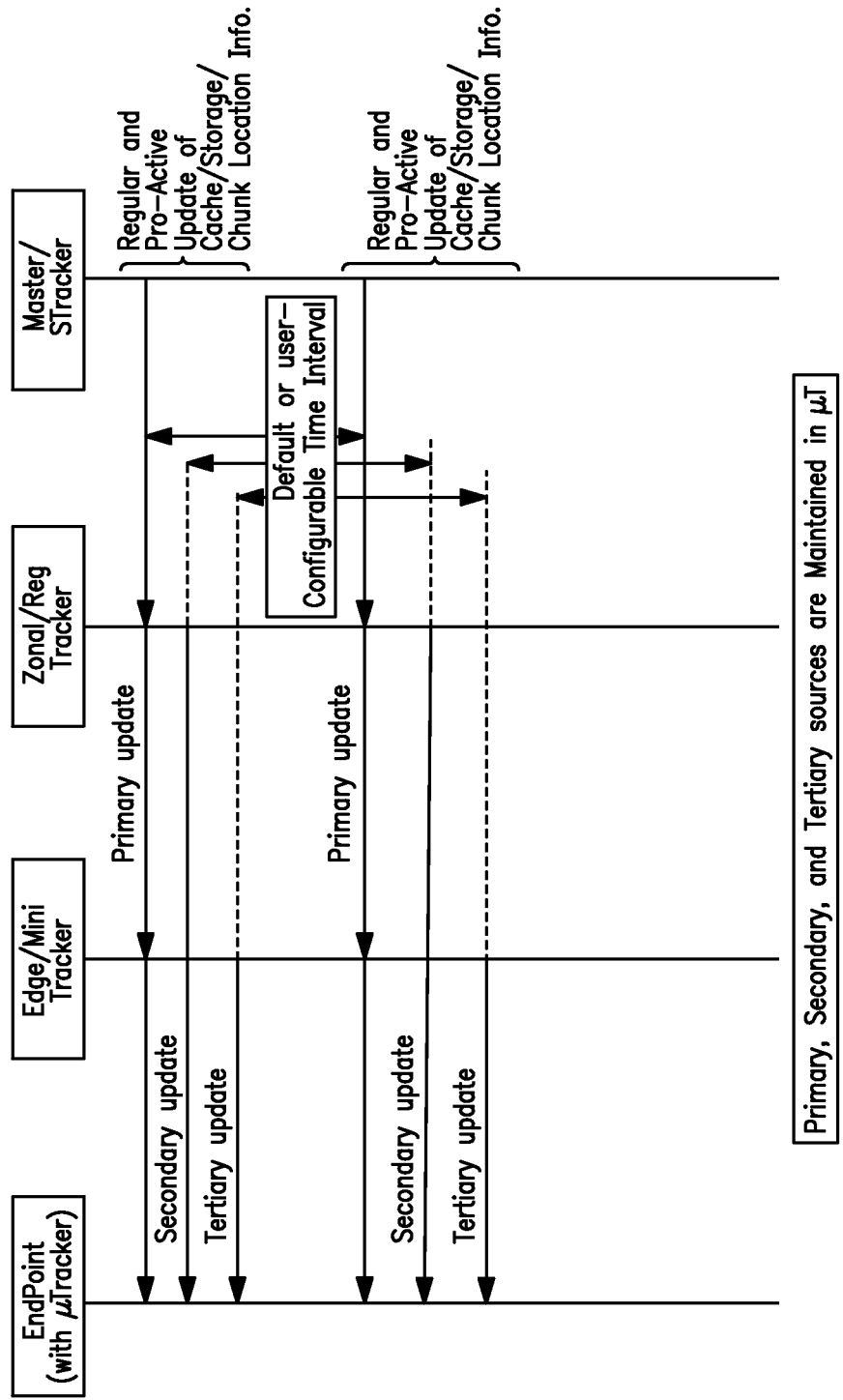
FIG. 3 illustrates steps implemented in an embodiment of the invention in updating of chunk/storage location information in the micro-tracker.

FIG. 3 illustrates steps implemented in an embodiment of the invention in updating of chunk/storage location information in the micro-tracker. Primary, secondary, and tertiary sources are maintained in the micro-tracker. Once again, under normal operations where there is no overloading and no malfunctioning of any category of the hosts, endpoints get up-to-date information about location of the chunk/storage from the primary host in the hierarchy. However, during verified (e.g., no response received within a preset time interval) fault or overload situations, the endpoint will have the authority to bypass the faulty (or overloaded) hosts, and can use the secondary and/or tertiary hosts in order to retrieve the latest location information.

Figure 4:
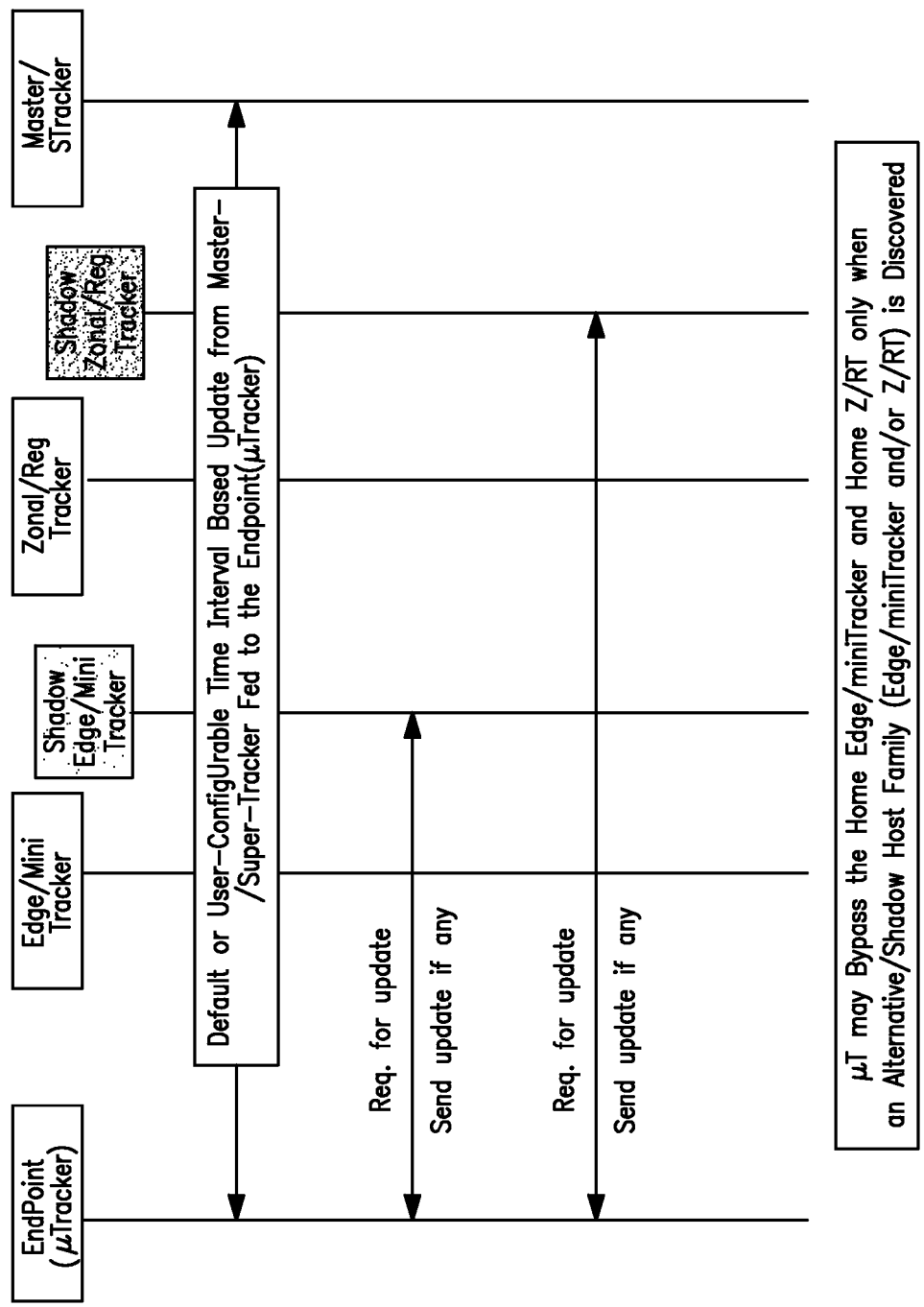
FIG. 4 illustrates steps implemented in an embodiment of the invention in the bypassing of the edge/mini-tracker and zonal/regional tracker by the micro-tracker for obtaining chunk/storage location information.

FIG. 4 illustrates steps implemented in an embodiment of the invention in the bypassing of the edge/mini-tracker and zonal/regional tracker by the micro-tracker for obtaining chunk/storage location information. A micro-tracker may bypass the home edge/mini-tracker and home zonal/regional tracker only when an alternative/shadow host family (edge/mini-tracker and/or zonal/regional tracker) is discovered, and the home edge/mini-tracker and home zonal/regional tracker have verifiable overload and/or fault conditions.

One M/ST can be implemented via a fully-protected (in each direction of transmission) logical ring of high-capacity trackers (servers), and these servers can be geographically distributed to support geo-redundancy. The same mechanism can be utilized for other trackers as well, except for the micro-trackers.

The foregoing description of the invention illustrates and describes embodiments of the present invention. It is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein.

What is claimed:

1. A hierarchical system, having a memory and a processor, comprising:

at least one micro tracker included in a wired or mobile end device, wherein a micro tracker is configured to provide a location of content that is disseminated through a distributed network;

at least one mini tracker which is configured to keep information on the location of the content and to distribute the information to micro trackers in a first jurisdiction;

at least one zone tracker which is configured to keep information on the location of the content in a region and to distribute the information to mini trackers in a second jurisdiction; and a master tracker which is configured to keep information on the location of the content in all regions in a third jurisdiction to distribute the information to zone trackers in the third jurisdiction, wherein the micro tracker is configured to obtain location information from at least one of the mini tracker or zone tracker if a primary source malfunctions, wherein after an initial period the zone tracker is configured to request and receive a real-time update from the master tracker, the mini tracker is configured to request and receive a real-time update from the zone tracker, and the micro tracker is configured to request and receive a real-time update from the mini tracker, and wherein the micro tracker is configured to maintain information about primary, secondary and tertiary sources, wherein during normal operations the micro tracker is configured to obtain location information from a host mini tracker, and during abnormal operations, the micro tracker is configured to bypass the host mini tracker and to use secondary or tertiary hosts to retrieve location information.

2. The system of claim 1, wherein a mini tracker serves multiple micro trackers in the first jurisdiction.

3. The system of claim 1, wherein a zone tracker serves multiple min trackers in the second jurisdiction.

4. The system of claim 1, wherein the master tracker serves all zone trackers in the third jurisdiction.

5. The system of claim 1, wherein during normal operation endpoints receive up-to-date location information from an associated tracker in the next level in the hierarchy.

6. The system of claim 1, wherein the third jurisdiction includes multiple second jurisdictions and the second jurisdiction includes multiple first jurisdictions.

7. The system of claim 1, wherein at least one of a broadcast, Group/Select-Cast, multi-cast, or on-demand technique is used in the dissemination of information between the trackers.

8. The system of claim 1, wherein information is initially sent from the master tracker to the micro tracker through the zone tracker and the mini tracker, respectively, at a predefined time.

9. The system of claim 1, wherein at predefined period after an initial period, the mini tracker is configured to request and receive an update from the master tracker, via the zone tracker, and the micro tracker is configured to request and receive an update from the zone tracker, via the mini tracker.

10. The system of claim 1, wherein the micro tracker is located in the lowest level, the mini tracker is located in the next level, the zone tracker is located in the next level above the mini tracker and the master tracker is located in the highest level of the hierarchical system.

11. The system of claim 1, wherein the micro tracker is configured to bypass a host zone tracker or the host mini tracker when an alternative host is discovered and the host zone tracker or the host mini tracker has a verifiable fault condition.

12. A method, comprising:
sending location information from a master tracker to a micro tracker, through a zone tracker and a mini tracker, respectively, at a predefined time;

requesting and receiving, after the initial period by the zone tracker, a real-time update from the master tracker;

requesting and receiving, after the initial period by the mini tracker, a real-time update from the zone tracker; and requesting and receiving, after the initial period by the micro tracker, a real-time update from the mini tracker, wherein each tracker is located in a different hierarchical level in a system and the micro tracker is configured to obtain location information from at least one of the mini tracker or zone tracker if a primary source malfunctions, wherein after an initial period the zone tracker is configured to request and receive a real-time update from the master tracker, the mini tracker is configured to request and receive a real-time update from the zone tracker, and the micro tracker is configured to request and receive a real-time update from the mini tracker, and wherein the micro tracker is configured to maintain information about primary, secondary and tertiary sources, wherein during normal operations the micro tracker is configured to obtain location information from a host mini tracker, and during abnormal operations, the micro tracker is configured to bypass the host mini tracker and to use secondary or tertiary hosts to retrieve location information.

13. The method of claim 12, further comprising requesting and receiving, at a predefined period after the initial period by the mini tracker, an update from the master tracker, via the zone tracker, and requesting and receiving, at the predefined period after the initial period by the micro tracker, an update from the zone tracker, via the mini tracker.

14. The method of claim 12, further comprising maintaining information about primary, secondary and tertiary sources by the micro tracker, wherein during normal operations the micro tracker is configured to obtain location information from a host mini tracker, and during abnormal operations, the micro tracker is configured to bypass the host mini tracker and to use secondary or tertiary hosts to retrieve location information.

15. The method of claim 14, further comprising bypassing, by the micro tracker, a host zone tracker or the host mini tracker when an alternative host is discovered and the host zone tracker or the host mini tracker has a verifiable fault condition.

16. An apparatus, comprising:
a processor;

means for sending location information from a master tracker to a micro tracker, through a zone tracker and a mini tracker, respectively, at a predefined time;

means for requesting and receiving, after the initial period by the zone tracker, a real-time update from the master tracker;

means for requesting and receiving, after the initial period by the mini tracker, a real-time update from the zone tracker; and means for requesting and receiving, after the initial period by the micro tracker, a real-time update from the mini tracker, wherein each tracker is located in a different hierarchical level in a system and the micro tracker is configured to obtain location information from at least one of the mini tracker or zone tracker if a primary source malfunctions, wherein after an initial period the zone tracker is configured to request and receive a real-time update from the master tracker, the mini tracker is configured to request and receive a real-time update from the zone tracker, and the micro tracker is configured to request and receive a real-time update from the mini tracker, and
wherein the micro tracker is configured to maintain information about primary, secondary and tertiary sources, wherein during normal operations the micro tracker is configured to obtain location information from a host mini tracker, and during abnormal operations, the micro tracker is configured to bypass the host mini tracker and to use secondary or tertiary hosts to retrieve location information.

* * * * *